May 12, 1931.  P. F. KRENZKE  1,804,423
APRON CONVEYER
Filed Nov. 21 1928  2 Sheets-Sheet 1
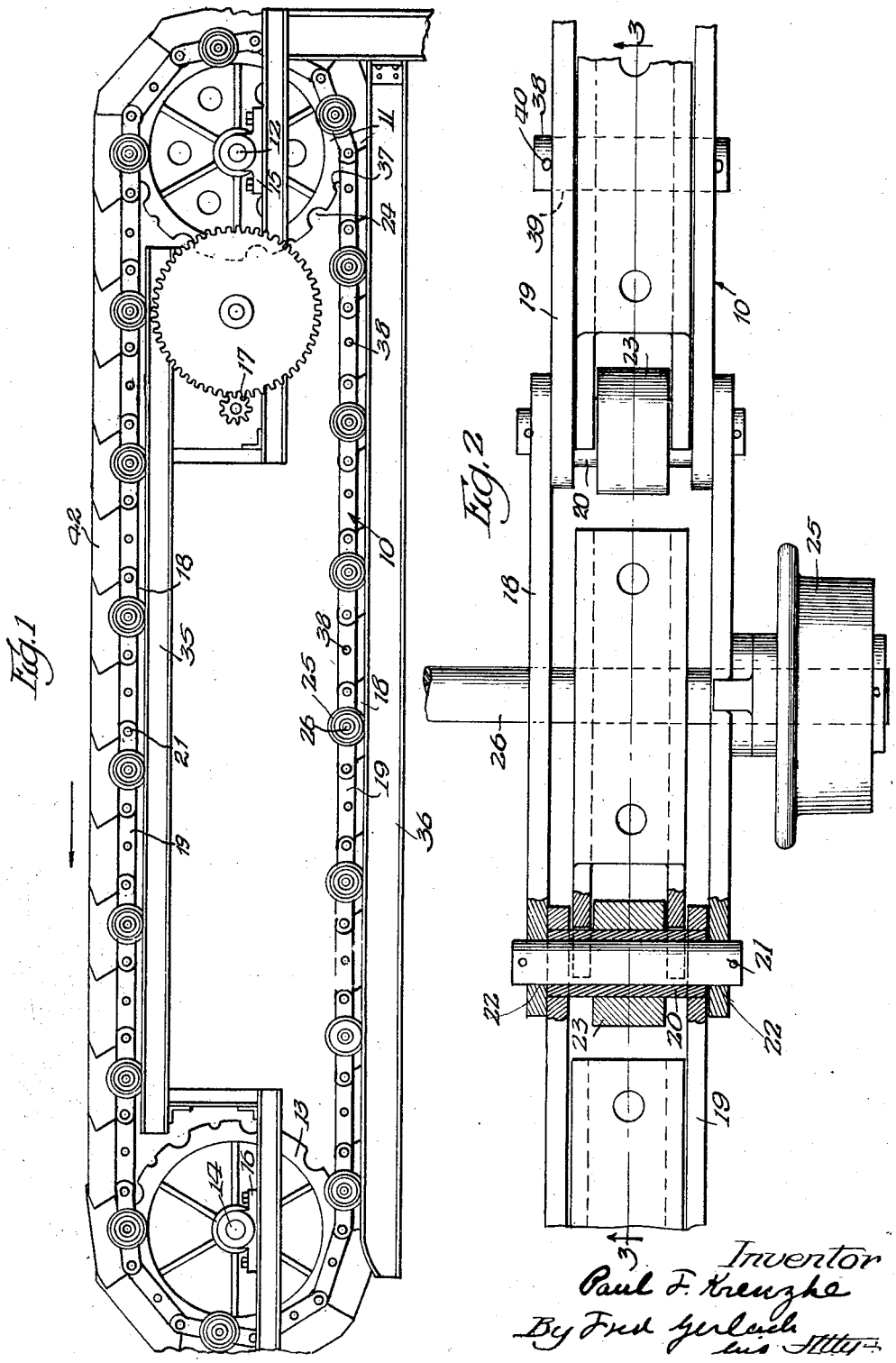
Inventor
Paul F. Krenzke
By Fred Gerlach
his Atty.

May 12, 1931. P. F. KRENZKE 1,804,423
APRON CONVEYER
Filed Nov. 21, 1928 2 Sheets-Sheet 2
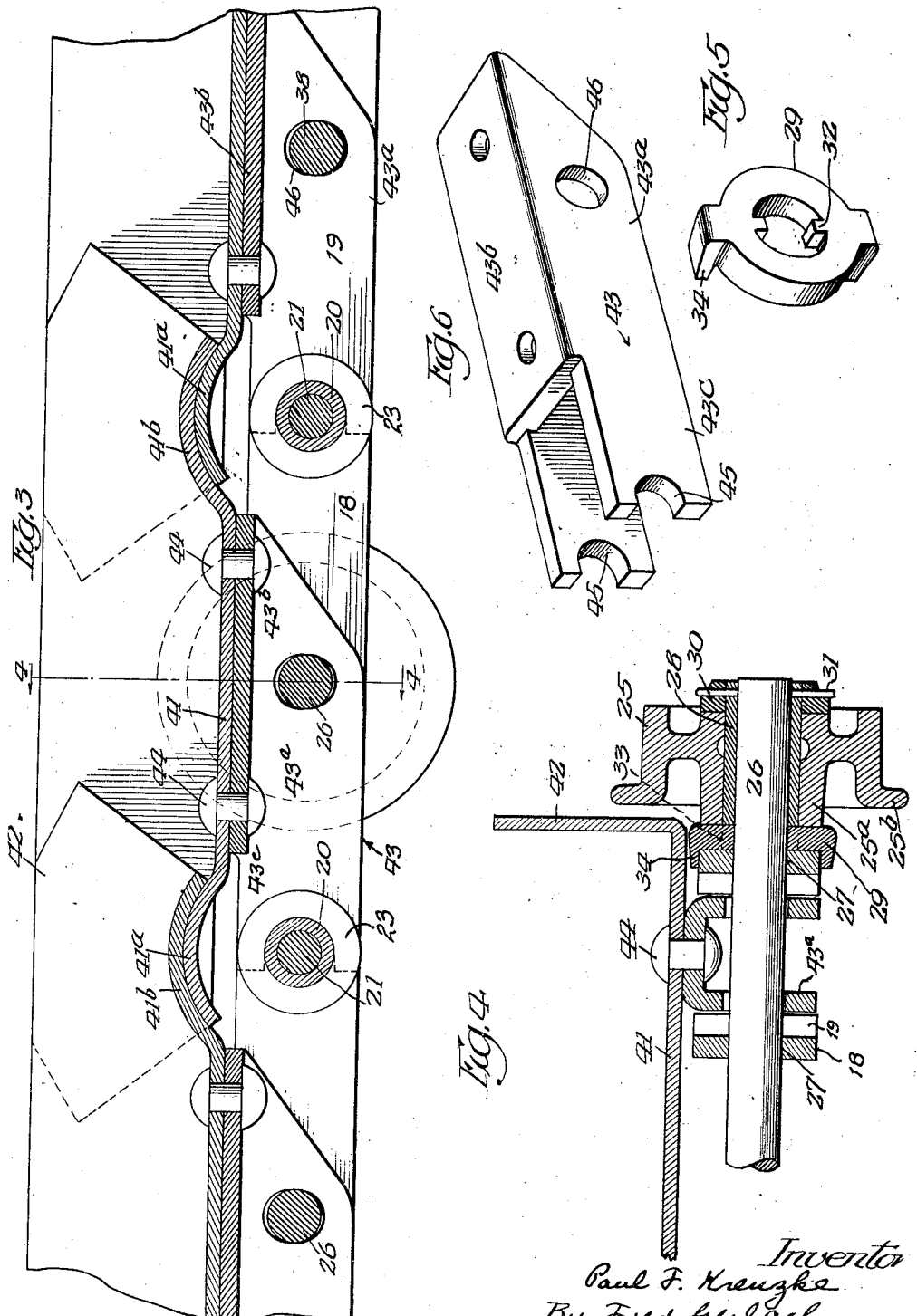

Patented May 12, 1931

1,804,423

UNITED STATES PATENT OFFICE

PAUL F. KRENZKE, OF CHICAGO, ILLINOIS

APRON CONVEYER

Application filed November 21, 1928. Serial No. 320,793.

The invention pertains generally to endless conveyer mechanisms and more particularly to apron conveyers which are adapted for use in moving coal, coke, ashes, crushed stone, sand, gravel and other granular material and comprise a longitudinal series of pans which are connected adjacent the sides thereof to chains or link-bars and have lapped ends to form joints or seals between them for the purpose of forming a continuous supporting surface and preventing the material from being displaced and dropping into engagement with the pivot pins for the link-bars as well as the sprocket wheels at the ends of the conveyer.

One object of the present invention is to provide an apron conveyer in which the ends of the pans that have the overlapping margins are movable toward and away from the chains so that the action of gravity supplemented by the weight of the superincumbent material forces them into engagement with the underlying end margins of the adjoining pans and consequently operates to maintain at all times an effective seal between the pans regardless of wear.

Another object of the invention is to provide an endless conveyer mechanism of the aforementioned character, in which the movable connecting medium or instrumentality between the pans and the chains is in the form of supplemental links which are constructed to permit the pans to be removed individually without breaking the chains or disconnecting the link-bars thereof.

A further object of the invention is the provision of connecting or supplemental links between the pans and the chains, which are U-shaped in cross section and serve to hold the driving collars against axial displacement on the pivot pins.

A still further object of the invention is to provide an apron conveyer which may be produced at a comparatively low cost and in which facility of replacement of the various parts is combined with durability and compactness of construction.

In addition the invention contemplates as one of its objects the provision of an endless conveyer mechanism which is efficient in operation and is generally of an improved character.

Other objects of the invention and the various advantages and characteristics of the present conveyer construction will be apparent from a consideration of the following detailed description.

The invention consists in the several novel features hereinafter set forth and more particularly defined by the claims at the conclusion hereof.

In the drawings which accompany and form a part of this specification or disclosure and in which like numerals of reference denote corresponding parts throughout the several views:

Figure 1 is a side elevation of a conveyer mechanism embodying the invention, showing the same in its operative position and in conjunction with sprocket wheels, and rails for supporting and maintaining rectilinear the upper and lower reaches of the conveyer;

Figure 2 is a fragmentary plan view of the upper reach of one of the chains and the parts associated therewith;

Figure 3 is a vertical and longitudinal section taken on the line 3—3 of Figure 2, showing in detail the construction of the rod and slot connections which extend between the supplemental links and the chains and are operative to permit movement of the overlapping margins of the pans;

Figure 4 is a transverse section taken on the line 4—4 of Figure 3, illustrating the manner in which the carrying rollers for the chains are journalled on the cross rods;

Figure 5 is a perspective of one of the keepers which operate to prevent rotation of the cross rods; and Figure 6 is a perspective view of one of the supplemental links for connecting together the pans and chains.

The endless conveyer which forms the subject matter of the invention is of the apron type and is adapted for use in moving from one place to another granular material, such for example as coal, gravel, crushed ore, etc. This conveyer comprises a pair of horizontally positioned endless chains 10 which are arranged in side by side and spaced relation.

A pair of sprocket wheels 11 support the chains adjacent the delivery ends thereof. These sprocket wheels are mounted on a transversely extending shaft 12 and are laterally positioned thereon to space the chains the desired distance apart. The discharge ends of the chains 10 are supported by a pair of sprocket wheels 13 which are mounted on a transversely extending shaft 14 and are aligned with the sprocket wheels 11. The shafts 12 and 14 are journalled in bearing structures 15 and 16 respectively. The chains are driven to effect movement of the conveyer, by means of any suitable driving mechanism or gearing 17 which is applied to either of the shafts 12, 14.

Each of the chains 10 consists of a longitudinal series of pairs of outside link-bars 18 and a series of pairs of inside link-bars 19. The pairs of inside bars alternate with the pairs of outside bars and are provided at the ends thereof with sleeves 20. The latter serve to space apart the bars of the inside pairs and form bearings for pivot pins 21. The ends of these pins project beyond the outer faces of the inside bars 19 and extend through holes 22 which are punched or otherwise formed in the ends of the outside bars 18. Said outside bars are held in place against displacement by riveting over the ends of the pins 21 or providing the latter with cotter pins or similar retaining devices. The pivot pins constitute the articulation points for the link-bars and are arranged so that the pins of one chain are coaxial or in longitudinal alignment with the pins of the other chain. Driving collars 23 are rotatively mounted on the central portions of the sleeves 20. These collars are adapted to fit into sockets 24 in the peripheries of the sprocket wheels and form a driving medium between the chains and wheels whereby the conveyer is driven without wear resulting to the sleeves 20.

The upper and lower reaches of the conveyer chains 10 are carried by wheels or rollers 25 so that they travel in rectilinear paths. These carrying rollers comprise hubs 25$^a$ and flanged body portions 25$^b$. They are arranged in pairs and are mounted on the ends of cross rods 26. The latter extend transversely with respect to the chains and have the ends thereof mounted in circular holes or apertures 27 which are punched or otherwise formed in the central portions of the outside link-bars 18. The holes 27 are preferably positioned midway between the articulation points and correspond in diameter to the cross rods 26. The carrying rollers 25 are rotatably mounted on bushings 28 and are confined against axial displacement by keeper-members 29 and rings 30 which abut against the inner and outer ends of the hubs 25$^a$ respectively. The rings encircle the extreme outer ends of the bushings and are fixedly secured to the ends of the cross rods by transverse keys or pins 31. The latter extend through the bushings and serve to hold them in fixed relation with respect to the cross rods. The keeper-members 29 fit around the inner ends of the bushings 28 and are locked against co-relative rotary movement by inwardly projecting teeth or lugs 32 which extend into and interfit with notches 33 in the inner ends of the bushings. The outer peripheral portions of the keeper-members are provided with diametrically opposite fingers 34 which extend over and grip the side edges of the outermost link-bars 18 to prevent the keeper-members together with the bushings and cross rods from rotating. The carrying rollers 25 are supported, when traveling in the upper reach of the conveyer, upon a pair of horizontal and parallel rails 35. These rails are secured to the top portions of the bearing structures 15 and 16 and extend so that the ends thereof terminate inwardly of the sprocket wheels 11 and 13. A pair of parallel rails 36 operate to support the carrying rollers when they travel in the lower reach of the conveyer. These last mentioned rails are located beneath the rails 35 and are also secured to the bearing structures 15 and 16. The sprocket wheels are provided midway between the sockets 24 with recesses 37. The latter operate to receive successively the cross-rods 26 during rotation of said wheels. The flanges on the body portions of the carrying wheels 25 prevent lateral displacement of the conveyer chains relatively to the supporting rails 35 and 36.

The bars of each pair of inside links 19 are cross-connected by a pin 38 which extends through circular holes or apertures 39 in said bars. The holes 39 like the holes 37 are positioned midway between the articulation points and correspond in diameter to the pins 38. The latter are held against axial movement with respect to the inside link-bars by cotter pins 40. They differ from the cross rods 26 in that the latter extend through both conveyer chains. During movement at the ends of the conveyer the cross pins 38 fit within the recesses 37 in the sprocket wheels.

The material to be conveyed is supported upon a series of pans 41, there being one pan for each two opposite pairs of link-bars. These pans extend transversely across the chains 10 and have the side margins thereof projecting a short distance beyond the outermost link-bars. Sides 42 are welded or otherwise secured to the side edges of the pans and operate to prevent the material from spilling over the sides of the conveyer. The front ends of the pans are bent or deflected to form concavo-convex marginal portions 41$^a$. These portions are located directly over the pivot pins 21. The rear or trailing ends of the pans are bent similarly to the front ends and form semi-cylindrical marginal portions 41ᵇ which extend so as to overlap the portions 41ᵃ on the adjoining pans and form therewith lap-joints or seals whereby a continuous supporting surface is presented to the material. The portions 41ᵃ and 41ᵇ are concentric with respect to the articulation joints so that the joints between the pans will remain intact during rotary movement thereof at the ends of the conveyer. The ends of the sides 42 are extended and shaped to form lap-joints at the sides of the pans. These joints are of such character that they also remain intact when they are rotated by the sprocket wheels during movement thereof at the ends of the conveyer.

Each of the pans 41 is connected to the chains by means of a pair of supplemental links 43. These links are positioned adjacent the side margins of the pans and each comprises a pair of oppositely facing side walls 43ᵃ and a base 43ᵇ. The base members of the links fit against the under faces of the pans and are rigidly held in place by rivets 44. There are preferably two rivets for each base and these rivets extend through the central portion of the superjacent pan. The front and rear ends of the bases 43ᵇ terminate adjacent the marginal portions 41ᵃ and 41ᵇ respectively. The side walls 43ᵃ are adapted to extend between the link-bars. The front ends of each pair of said side walls extend forwardly of the base 43ᵇ and terminate adjacent the marginal portion 41ᵃ in fork shaped members 43ᶜ. The front edges of these members have formed therein semi-circular recesses 45 which are adapted to receive the adjoining sleeve 20. The members 43ᶜ operate to form pivotal connections between the supplemental links and the pivot pins, which permit the rear ends of the pans to swing toward and away from the chains so that the action of gravity supplemented by the weight of the material forces the marginal portions 41ᵇ of those pans in the upper reach of the conveyer into firm engagement with the underlying marginal portions 41ᵃ of the adjoining pans. By means of this arrangement the lap-joints between the pans form at all times an effective seal regardless of wear. The members 43ᶜ operate additionally to hold the driving collars 23 against axial displacement on the sleeves 20. The pivotal movement of the supplemental links which are associated with the outside link-bars 18 is limited by the cross-rods 26 which extend through transversely elongated slots 46 in the central parts of the side walls 43ᵃ. The pivotal movement of the links 43 which are associated with the inside link-bars 19 is limited by the cross pins 38 which, like the cross rods 26, extend through the elongated slots in the side walls. The rod and slot connections between the links together with the pivotal connections between the members 43ᶜ and the pivot pins 21 exemplify means of an improved character for connecting the pans to the chains. An advantage of such means is that the pans may be removed without breaking the chains. This operation is accomplished by sliding the cross rods 26 and the pins 38 axially out of engagement with the side walls of the links. The rear ends of the side walls 43ᵃ are cut away on diagonal lines for the purpose of eliminating excess weight and to permit the rear ends of the supplemental links to be shifted readily into their operative position during assembly of the various parts.

The conveyer is driven by applying power to one of the shafts 12, 14. This causes rotation of the sprocket wheels and results in movement of the chains and pans. When the pans travel in the upper reach or leg of the conveyer, the weight of the material plus that of the pans, causes the overlapping marginal portions 41ᵇ to be forced into firm contact with the portions 41ᵃ of the contiguous pans and consequently results in the formation of an effective seal between the pans. Since the pans are movably supported, the seal is always efficient in preventing displacement of the material even though the portions 41ᵃ and 41ᵇ become worn.

The conveyer construction herein disclosed may be manufactured at a comparatively low cost and permits ready replacement of the various parts.

This invention is not to be understood as restricted to the details set forth, since these may be modified within the scope of the appended claims, without departing from the spirit and scope of the invention.

Having thus described the invention, what I claim as new and desire to secure by Letters Patent, is:

1. In an apron conveyer, the combination of an endless chain, sprocket wheels for supporting and driving the chain, a series of pans having lapped ends, links secured fixedly to the inner faces of the pans, and connected movably to the pivot pins of the chain so that the overlapping end of each pan is free to move transversely to and from the underlying end of the adjoining pan during travel between the sprocket wheels, and means comprising members connected to the chain for limiting the outward movement of the pans.

2. In an apron conveyer, the combination of an endless chain consisting of link-bars and pivot pins between the ends of the link-bars, sprocket wheels for supporting and driving the chain, a series of pans having lapped ends, links fixedly secured to the inner faces of the pans, and connected pivotally to the pivot pins of the chain so that the overlapping end of each pan is free to move transversely to and from the underlying end of the adjoining pan, and means for limiting the outward movement of the pans comprising pin and slot connections between the link-bars and the links.

3. In an apron conveyer, the combination of an endless chain consisting of pairs of link-bars and pivot pins between the ends of the link-bars, sprocket wheels for supporting and driving the chain, a series of pans having lapped ends, links fixedly secured to the inner faces of the pans, each of said links embodying a side wall positioned between one pair of link-bars, the said links having sockets formed in the side walls thereof to receive the pivot pins and form therewith pivotal connections whereby the pans are carried by the chain so that the overlapping end of each pan is free to move transversely relatively to the underlying end of the adjoining pan, and means for limiting the outward movement of the pans.

4. In an apron conveyer, the combination of an endless chain consisting of link-bars and pivot pins between the ends of the link-bars, sprocket wheels for supporting and driving the chain, a series of pans having lapped ends, links fixedly secured to the inner faces of the pans and embodying side walls, said walls being positioned opposite the link-bars and having substantially semi-circular sockets formed therein, said sockets being operative to receive the pivot pins and form therewith pivotal connections whereby the pans are carried by the chain so that the overlapping end of each pan is free to move transversely relatively to the underlying end of the adjoining pan, and means for limiting the outward movement of the pans comprising pin and slot connections between the side walls and central parts of the link-bars.

5. In an apron conveyer, the combination of an endless chain consisting of link-bars and pivot pins between the ends of the link-bars, sprocket wheels for supporting and driving the chain, a series of pans having lapped ends, links fixedly secured to the inner faces of the pans and embodying side walls, said walls being positioned opposite the link-bars and having substantially semi-circular sockets formed in the front ends thereof and elongated slots in their central parts, the sockets being operative to receive the pivot pins and form therewith pivotal connections whereby the pans are carried by the chain so that the overlapping end of each pan is free to move transversely relatively to the underlying end of the adjoining pan, and pins for limiting the outward movement of the pan, said pins being carried by the central parts of the link-bars and extending through the elongated slots in the side walls of the links.

6. In an apron conveyer, the combination of an endless chain consisting of pairs of link-bars and pivot pins between the ends of the link-bars, sprocket wheels for supporting and driving the chain, a series of pans having lapped ends, and links fixedly secured to the inner faces of the pans, each of said links embodying a pair of oppositely facing side walls positioned between one pair of link-bars, the front ends of said side walls having sockets formed therein to receive the pivot pins and form therewith pivotal connections whereby the pans are carried by the chain so that the overlapping end of each pan is free to move transversely relatively to the underlying end of the adjoining pan.

7. In an apron conveyer, the combination of an endless chain consisting of pairs of link-bars and pivot pins between the ends of the link-bars, driving collars on the pivot pins between the link-bars, sprocket wheels for supporting and driving the chain, said wheels having sockets formed therein for receiving the driving collars, a series of pans having lapped ends, and links fixedly secured to the inner faces of the pans, each of said links embodying a pair of oppositely facing side walls positioned between one pair of link-bars, the front ends of the side walls being adapted to hold the driving collars against axial displacement and being shaped to receive the pivot pins and form therewith pivotal connections whereby the pans are carried by the chain so that the overlapping end of each pan is free to move transversely relatively to the underlying end of the adjoining pan.

8. In an apron conveyer, the combination of a pair of endless chains arranged in side by side relation, each of the chains consisting of link-bars and pivot pins between the ends of the link-bars, sprocket wheels for supporting and driving the chains, pairs of rails supported between said sprocket wheels, a series of pans extending longitudinally of the chains and having lapped ends, a pair of links fixedly secured to the inner face of each pan adjacent the sides thereof and associated with the chains respectively, the links having elongated slots formed in the central parts thereof, and sockets in the front ends thereof to receive the pivot pins and form therewith pivotal connections whereby the pans are carried by the chain so that the overlapping end of each pan is free to move to and from the underlying end of the contiguous pan, rods extending through both chains and the elongated slots in the links, and wheels on the ends of the rods traversable on the rails.

Signed at Chicago, Illinois, this 17th day of November, 1928.

PAUL F. KRENZKE.